United States Patent
Kumar et al.

(10) Patent No.: US 11,579,387 B2
(45) Date of Patent: Feb. 14, 2023

(54) ARRANGEMENT OF OPTICAL FIBRE RIBBON STACK AND AN OPTICAL FIBRE RIBBON THEREOF

(71) Applicant: Sterlite Technologies Limited, Gurgaon (IN)

(72) Inventors: Sravan Kumar, Gurgaon (IN); Hemanth Kondapalli, Gurgaon (IN)

(73) Assignee: Sterlite Technologies Limited, Gurgaon (IN)

( * ) Notice: Subject to any disclaimer, the term of this patent is extended or adjusted under 35 U.S.C. 154(b) by 0 days.

(21) Appl. No.: 16/802,519

(22) Filed: Feb. 26, 2020

(65) Prior Publication Data

US 2021/0048590 A1 Feb. 18, 2021

(30) Foreign Application Priority Data

Aug. 14, 2019 (IN) .............................. 201911032851

(51) Int. Cl.
*G02B 6/44* (2006.01)

(52) U.S. Cl.
CPC .................................. *G02B 6/4435* (2013.01)

(58) Field of Classification Search
CPC ..... G02B 6/4435; G02B 6/448; G02B 6/4403
See application file for complete search history.

(56) References Cited

U.S. PATENT DOCUMENTS

| 5,878,180 | A  | * | 3/1999 | Nothofer | G02B 6/4411 |
| | | | | | 385/114 |
| 7,206,481 | B2 | * | 4/2007 | Quinn | G02B 6/4486 |
| | | | | | 112/113 |
| 8,548,294 | B2 | * | 10/2013 | Toge | G02B 6/441 |
| | | | | | 385/114 |
| 9,841,573 | B1 | * | 12/2017 | Debban | G02B 6/4434 |
| 2003/0012531 | A1 | * | 1/2003 | Nechitailo | G02B 6/4411 |
| | | | | | 385/114 |
| 2010/0296781 | A1 | * | 11/2010 | Sato | G02B 6/4495 |
| | | | | | 385/114 |
| 2013/0156390 | A1 | * | 6/2013 | Matsuzawa | G02B 6/4403 |
| | | | | | 385/114 |
| 2015/0234139 | A1 | * | 8/2015 | Cignarale | G02B 6/4405 |
| | | | | | 385/114 |
| 2016/0070079 | A1 | * | 3/2016 | Saji | G02B 6/4495 |
| | | | | | 385/114 |
| 2019/0011656 | A1 | * | 1/2019 | Sato | G02B 6/44 |
| 2019/0049681 | A1 | * | 2/2019 | Bookbinder | G02B 6/4413 |
| 2019/0204519 | A1 | * | 7/2019 | Sato | G02B 6/44 |
| 2019/0219783 | A1 | * | 7/2019 | Ly | G02B 6/3873 |
| 2021/0116657 | A1 | * | 4/2021 | Kumar | G02B 6/4403 |

* cited by examiner

*Primary Examiner* — Ellen E Kim
(74) *Attorney, Agent, or Firm* — Steven R. Fairchild; Michael J. Pennington

(57) ABSTRACT

The optical fibre ribbon of the present disclosure has one or more base access. The optical fibre ribbon of the present disclosure includes a plurality of optical fibres, a coating layer bonding the plurality of optical fibres, and a slit. The slit in the optical fibre ribbon is made between two optical fibres of the plurality of the optical fibres. The optical fibre ribbon has flat surface on top and corrugated surface in bottom. The optical fibre ribbon has a coating layer that is a layer of matrix material. The coating layer is made of single layer of matrix material.

19 Claims, 7 Drawing Sheets

ARRANGEMENT OF OPTICAL FIBRE RIBBON STACK AND AN OPTICAL FIBRE RIBBON THEREOF

TECHNICAL FIELD

The present disclosure relates to the field of an optical fibre ribbon and, in particular, relates to an arrangement of the optical fibre ribbon stack and an optical fibre ribbon thereof. The present application is based on, and claims priority from an Indian Application Number 201911032851 filed on Aug. 14, 2019, the disclosure of which is hereby incorporated by reference herein.

BACKGROUND OF THE INVENTION

Over the last few years, optical fibre cables are widely used for communication over long distances. As a result, there is a demand for fibre optic cables with greater number of optical fibres. In addition, optical fibre ribbons have been developed in order to meet the demands for increased optical fibre count in optical fibre cables. Optical fibre ribbons are planar arrays of optical fibres that are bonded together as a unit. In addition, optical fibre ribbons are advantageous because many ribbons can be arranged together to form an optical fibre ribbon stack and optical fibre ribbons have the advantage of mass splicing. Further, the optical fibre cables are used to handle Dense Wavelength Division Multiplexing (DWDM).

Conventionally, optical fibre ribbon cables are limited to only 12 fibres per ribbon. Further, it is difficult or almost impossible to have various base access from a single optical fibre ribbon. However, various base access play a very important role in DWDM for improved networking and easier installation. Conventionally, the optical fibre ribbon cables includes optical ribbons that are placed in the form of a rectangular ribbon stack. In addition, the optical fibre cables includes the rectangular ribbon stack that does not have an optimum packing efficiency. Furthermore, the rectangular ribbon stack in the optical fibre cable leads to increase in the diameter of the optical fibre cable. Moreover, the diameter of the rectangular ribbon stack increases with the increase in the diagonal length of the rectangular ribbon stack. This leads to a lot of unutilized space in the optical fibre cable.

In light of the above stated discussion, there is a need for an optical fibre ribbon stack arrangement and optical fibre ribbon thereof which can overcome the above stated disadvantages.

SUMMARY OF THE INVENTION

The present disclosure provides to an optical fibre ribbon with one or more base access.

The optical fibre ribbon includes a plurality of optical fibres. In addition, the optical fibre ribbon includes a coating layer bonding the plurality of optical fibres. Further, the optical fibre ribbon includes a slit. Furthermore, the slit in the optical fibre ribbon is made between any two optical fibres of the plurality of optical fibres.

A primary object of the present disclosure is to provide an optical fibre ribbon stack with high count of optical fibres.

Another object of the present disclosure is to provide the optical fibre ribbon stack having square shaped configuration.

Yet another object of the present disclosure is to provide the optical fibre ribbon stack with high packing efficiency.

Yet another object of the present disclosure is to provide the optical fibre ribbon stack that reduces overall diameter of a cable in which the optical fibre ribbon stack is installed.

Yet another object of the present disclosure is to provide an easy access to one or more base in an optical fibre ribbon.

Yet another object of the present disclosure is to provide plurality of slits or small cuts in the optical fibre ribbon to access the one or more base of the optical fibre ribbon.

Yet another object of the present disclosure is to provide the optical fibre ribbon with high flexibility.

Yet another object of the present disclosure is to reduce dimensions of the optical fibre ribbon.

Yet another object of the present disclosure is to maintain planarity in the optical fibre ribbon.

Yet another object of the present disclosure is to provide the optical fibre ribbon that can easily bend backward in arc.

In an embodiment of the present disclosure, the optical fibre ribbon is one of a regular flat ribbon, an intermittent bonded ribbon and a bendable ribbon.

In an embodiment of the present disclosure, the optical fibre ribbon has flat surface on top and corrugated surface in bottom.

In an embodiment of the present disclosure, the coating layer is a layer of matrix material. In addition, the coating layer is made of single layer of matrix material.

In an embodiment of the present disclosure, each of the plurality of optical fibres in the optical fibre ribbon is coated with the coating layer in corrugated manner.

In an embodiment of the present disclosure, the coating layer of the optical fibre ribbon has uniform thickness throughout the plurality of optical fibres.

In an embodiment of the present disclosure, the slit is placed to access the one or more bases from the optical fibre ribbon.

In an embodiment of the present disclosure, the slit in the optical fibre ribbon has width in range of about 50 micron to 100 micron.

In an embodiment of the present disclosure, each of the plurality of optical fibres in the optical fibre ribbon is aligned at pitch in range of about 180 micron to 250 micron.

In another aspect, the present invention relates to an arrangement of an optical fibre ribbon stack. The optical fibre ribbon stack includes a plurality of optical fibre ribbons. In addition, the plurality of optical fibre ribbons is arranged in perfect square shape configuration. Further, each of the plurality of optical fibre ribbons has pitch value equal to height of each of the plurality of optical fibre ribbons.

In an embodiment of the present disclosure, the plurality of optical fibre ribbons has a plurality of slits to split the optical fibre ribbon for two or more base access.

In an embodiment of the present disclosure, number of the plurality of optical fibres placed in horizontal direction is equal to number of the plurality of optical fibres placed in vertical direction.

In an embodiment of the present disclosure, optical fibre ribbon stack is in a form of 24F*24F square shape.

In an embodiment of the present disclosure, number of the plurality of optical fibres in the optical fibre ribbon stack is 576.

In an embodiment of the present disclosure, the optical fibre ribbon stack has height in range of about 5.8 millimeter to 6.2 millimeter.

In an embodiment of the present disclosure, the optical fibre ribbon stack has width in range of about 5.8 millimeter to 6.2 millimeter.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
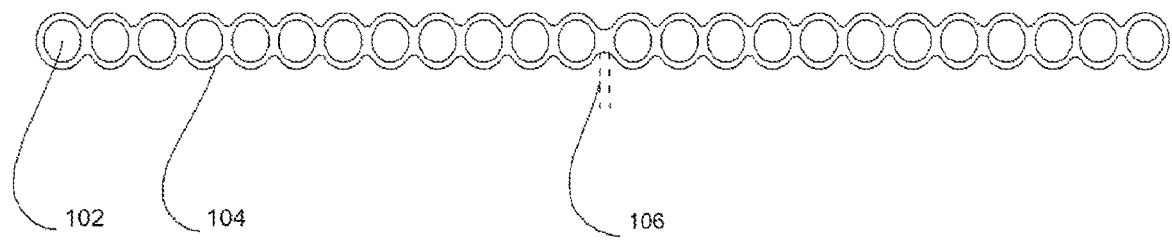
FIG. 1 is a cross sectional view of an optical fibre ribbon, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Optical fibre ribbon.
102. A plurality of optical fibres.
104. Coating layer.
106. Slit.
200. Optical fibre ribbon.
202. A plurality of optical fibres.
204. Coating layer.
206. First slit.
208. The second slit.
300. Optical fibre ribbon.
302. A plurality of optical fibres.
304. Coating layer.
306. First slit.
308. Second slit.
310. Third slit.
400. Optical fibre ribbon stack.
402. The first optical fibre ribbon stack
404. The second optical fibre ribbon stack.
500. A plurality of ribbon stacks.
502. The first optical fibre ribbon stack.
504. The second optical fibre ribbon stack.
506. The third optical fibre ribbon stack.
508. The fourth optical fibre ribbon stack.
600. The plurality of optical fibre ribbon stacks.
602. The first optical fibre ribbon stack.
604. The second optical fibre ribbon stack.
606. The third optical fibre ribbon stack.
608. The fourth optical fibre ribbon stack
700. Optical fibre cable.
702. A plurality of optical fibre ribbon stacks.
704. A plurality of buffer tubes.
706. Water swellable yarns.
708. A plurality of embedded strength members.
710. Ripcords.
712. Water blocking tape.
714 The sheath.
800. Optical fibre ribbon stack.
900. Optical fibre cable.
902. A plurality of buffer tubes.
904. Water blocking layer.
906. Sheath.
908. A plurality of strength members.
910. A plurality of water swellable yarns.
912. A plurality of ripcords.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Referring to FIG. 1, this is a cross sectional view of an optical fibre ribbon 100, in accordance with an embodiment of the present disclosure. The optical fibre ribbon 100 of the present disclosure includes a plurality of optical fibres 102 positioned along a longitudinal axis of the optical fibre ribbon 100. Further, the optical fibre ribbon 100 includes a coating layer 104. The coating layer 104 covers the plurality of optical fibres 102 to provide flexibility to the optical fibre ribbon 100. Furthermore, the optical fibre ribbon 100 includes a slit 106. In an embodiment of the present disclosure, the slit 106 is in a range of about 50 microns to 100 microns. In an embodiment of the present disclosure, the slit 106 has a "V" shaped structure. In another embodiment of the present disclosure, the slit 106 has a "U" shaped structure. In yet another embodiment of the present disclosure, the slit 106 may have structure of any shape. Moreover, the slit 106 is made between twelfth optical fibre and thirteenth optical fibre of the plurality of optical fibres 102 to access base 12 in the optical fibre ribbon 100. In an embodiment of the present disclosure, the slit 106 may be made between eighth optical fibre and ninth optical fibre of the plurality of optical fibres 102 and between sixteenth optical fibre and seventeenth optical fibre of the plurality of optical fibres 102 to access three base 8 optical fibre ribbons from the optical fibre ribbon 100 with 24 fibres.

The optical fibre ribbon 100 of the present disclosure includes the plurality of optical fibres 102. In addition, each one of the plurality of optical fibres 102 is placed adjacent to another optical fibre of the plurality of optical fibres 102. Further, each of the plurality of optical fibres 102 has diameter in a range of about 180 microns to 200 microns. In another embodiment of the present disclosure, diameter of each of the plurality of optical fibres 102 may vary. In an embodiment of the present disclosure, each of the plurality of optical fibres 102 is parallel to the other optical fibres of the plurality of optical fibres 102. Generally, we can define an optical fibre as a type of fibre that is used as guided medium for transmitting information from one end to another. In addition, information is transmitted in the form of light wave in fibre cable. In addition, optical fibre is a thin strand of glass or plastic capable of transmitting optical signals in the form of light. Further, optical fibre typically includes core that is made of drawing glass (silica) or plastic to a diameter slightly thicker than that of human hair. Furthermore, core is surrounded by a transparent cladding material. Moreover, cladding has lower refractive index than refractive index of core. Also, cladding has lower refractive index than core to achieve total internal reflection.

In an embodiment of the present disclosure, the optical fibre ribbon 100 includes 24 optical fibres. In another embodiment of the present disclosure, number of optical fibres in the optical fibre ribbon 100 may vary. In addition, the optical fibre ribbon 100 includes the coating layer 104 for covering the plurality of optical fibres 102. In an embodiment of the present disclosure, the coating layer 104 is made of a matrix material. Further, each coated optical fibre has diameter in a range of about 180 microns to 250 microns. In an embodiment of the present disclosure, diameter of the coated optical fibre may vary. Further, the matrix material imparts flexibility to the optical fibre ribbon 100. In general, flexibility may be referred to the ability of any material to undergo bending without any cracks or other failures when an external force is applied to it. In an embodiment of the present disclosure, the matrix material is a curable UV acrylate. In general, matrix material curable UV acrylate is a special kind of material having pre-defined flexibility. In an embodiment of the present disclosure, the curable UV acrylate has predefined properties. In general, curable UV acrylate is soft material having high elongation along with fast cure speed.

In an embodiment of the present disclosure, the optical fibre ribbon 100 has a single layer of matrix material over the plurality of optical fibres 102. In addition, matrix material is applied in a corrugated manner such that matrix material is applied in between the plurality of optical fibres 102. Further, matrix material forms an overall layer on the plurality of optical fibres 102. In an embodiment of the present disclosure, the coating layer 104 has uniform thickness throughout the plurality of optical fibres 102 including edge fibres.

Further, the optical fibre ribbon 100 includes the slit 106 of about 100 microns in the optical fibre ribbon 100. In addition, the slit 106 is made between twelfth optical fibre and thirteenth optical fibre of the plurality of optical fibres 102. Further, the slit 106 is used to access base 12 from the optical fibre ribbon 100 of 24 fibres. In an embodiment of the present disclosure, the slit 106 may be in between eighth optical fibre and ninth optical fibre of the plurality of optical fibres 102 and in between sixteenth optical fibre and seventeenth optical fibre of the plurality of optical fibres 102 to access three base 8 optical fibre ribbons from the optical fibre ribbon 100 with 24 fibres. Furthermore, the one or more base access plays a major key role in dense wavelength division multiplexing. In general, dense wavelength division multiplexing is a technology that multiplexes a plurality of data signals from a plurality of sources. In addition, dense wavelength division multiplexing works on the principle that each of the data signal is carried on a separate light wavelength. Further, dense wavelength division multiplexing allows large amounts of data to traverse on a single network link.

In an embodiment of the present disclosure, the optical fibre ribbon 100 has height in a range of about 210 microns to 250 microns. In another embodiment of the present disclosure, height of the optical fibre ribbon 100 may vary. In addition, the optical fibre ribbon 100 has width in a range of about 5.8 millimetres to 6.2 millimetres. In another embodiment of the present disclosure, the width of the optical fibre ribbon 100 may vary.

In an embodiment of the present disclosure, the optical fibre ribbon 100 has length of about 6050 micrometres. In another embodiment of present disclosure, the length of the optical fibre ribbon 100 may vary.

In an embodiment of the present disclosure, the optical fibre ribbon 100 has pitch in range of about 180 microns to 250 microns. In another embodiment of the present disclosure, pitch of the optical fibre ribbon 100 may vary. In general, pitch is defined as distance between the centres of two adjacent optical fibre of the plurality of optical fibres.

In an embodiment of the present disclosure, number of the plurality of optical fibres 102 in the optical fibre ribbon 100 is 24. In another embodiment of the present disclosure, number of the plurality of optical fibres 102 in the optical fibre ribbon 100 is 36. In yet another embodiment of the present disclosure, number of the plurality of optical fibres 102 in the optical fibre ribbon 100 is 48. In yet another embodiment of the present disclosure, the optical fibre ribbon 100 may have any suitable number of optical fibres.

Figure 2:
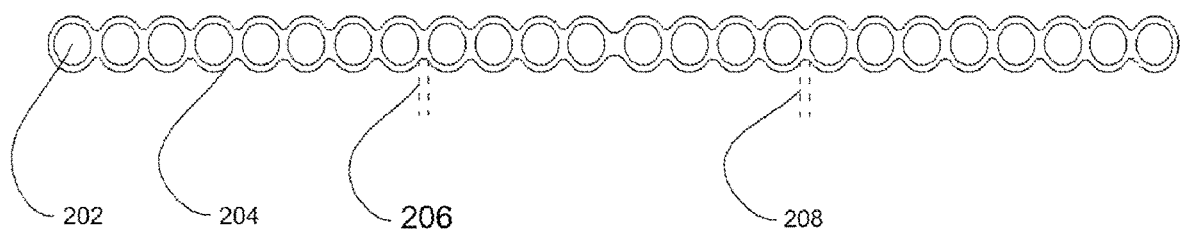
FIG. 2 is a cross sectional view of an optical fibre ribbon with one or more base access of the optical fibre ribbon, in accordance with another embodiment of the present disclosure.

According to FIG. 2, this is a cross sectional view of an optical fibre ribbon 200 of the present disclosure with one or more base access of the optical fibre ribbon 200, in accordance with an embodiment of the present disclosure. The optical fibre ribbon 200 is similar to the optical fibre ribbon 100 as seen in FIG. 1. The optical fibre ribbon 200 includes a plurality of optical fibres 202 positioned along a longitudinal axis of the optical fibre ribbon 200. In addition, the optical fibre ribbon 200 includes a coating layer 204. The coating layer 204 is used to cover the plurality of optical fibres 202. In an embodiment of the present disclosure, the coating layer 204 is made of the matrix material. In general, matrix material is able to bind fibres together and able to distribute the load. The optical fibre ribbon 200 includes a plurality of slits. The plurality of slits includes a first slit 206 and a second slit 208.

In an embodiment of the present disclosure, the first slit 206 is made between eighth optical fibre and ninth optical fibre of the plurality of optical fibres 202 in the optical fibre ribbon 200 of 24 fibres. In addition, the first slit 206 of about 100 microns is used to access one base 8 from the optical fibre ribbon 200 of 24 fibres. In addition, one base 8 and one base 16 is accessed when only the first slit 206 is present in the optical fiber ribbon 200. Further, the second slit 208 is made between sixteenth optical fibre and seventeenth optical fibre of the plurality of optical fibres 202 in the optical fibre ribbon 200 of 24 fibres. Also, the second slit 208 is of about 100 microns. Also, the first slit 206 and the second slit 208 are simultaneously used to access three base 8 ribbons from the optical fibre ribbon 200 of 24 fibres. In another embodiment of the present disclosure, positions of the plurality of slits may vary with requirement.

In an embodiment of the present disclosure, the plurality of slits in the optical fibre ribbon 200 of 24 fibres provides easy access of three base-8 of the optical fibre ribbon 200. In another embodiment of the present disclosure, position of the plurality of slits may vary with requirement.

According to FIG. 2, the first slit 206 and the second slit 208 facilitates easy access of three base 8 of the optical fibre ribbon 200 of 24 fibre; however those skilled in the art would appreciate that there may be any number of slits at various positions to access various bases of the optical fibre ribbon 200.

In an embodiment of the present disclosure, number of the plurality of optical fibres 202 in the optical fibre ribbon 200 is 24. In another embodiment of the present disclosure, number of the plurality of optical fibres 202 in the optical fibre ribbon 200 is 36. In yet another embodiment of the present disclosure, number of the plurality of optical fibres 202 in the optical fibre ribbon 200 is 48. In yet another embodiment of the present disclosure, the optical fibre ribbon 200 may have any suitable number of optical fibres.

In an embodiment of the present disclosure, the optical fibre ribbon 200 has pitch in a range of about 180 microns to 250 microns. In another embodiment of the present disclosure, pitch of the optical fibre ribbon 200 may vary. In an embodiment of the present disclosure, each of the plurality of optical fibres 202 has diameter in range of about 180 microns to 250 microns. In another embodiment of the present disclosure, diameter of each of the plurality of optical fibres 202 may vary. In an embodiment of the present disclosure, coated optical fibre has diameter in range of about 180 microns to 220 microns. In another embodiment of the present disclosure, diameter of the coated optical fibre may vary.

In an embodiment of the present disclosure, the optical fibre ribbon 200 has height in a range of about 210 microns to 250 microns. In another embodiment of present disclosure, height of the optical fibre ribbon 200 may vary. In an embodiment of the present disclosure, the optical fibre ribbon 200 has width in a range of about 5.8 millimetre to 6.2 millimetre. In another embodiment of present disclosure, width of the optical fibre ribbon 200 may vary. In an embodiment of the present disclosure, the optical fibre ribbon 200 has length of about 6150 micrometre. In another embodiment of present disclosure, length of the optical fibre ribbon 200 may vary.

Figure 3:
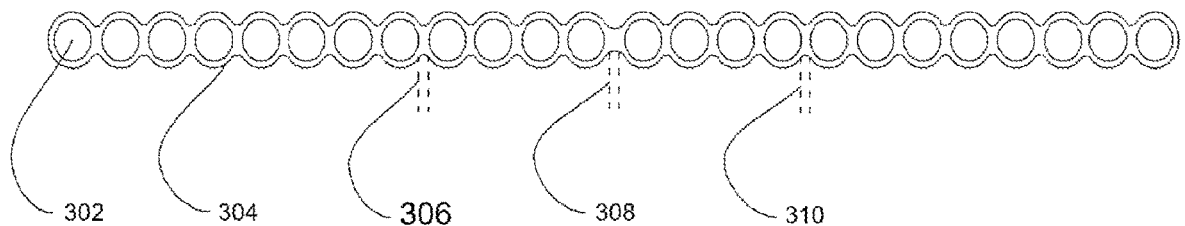
FIG. 3 is a cross sectional view of an optical fibre ribbon with one or more base access of the optical fibre ribbon, in accordance with yet another embodiment of the present disclosure.

Referring to FIG. 3, this is a cross sectional view of an optical fibre ribbon 300 with one or more base access of the optical fibre ribbon 300, in accordance with an embodiment of the present disclosure. The optical fibre ribbon 300 is similar to the optical fibre ribbon 100. The optical fibre ribbon 300 includes a plurality of optical fibres 302 positioned along a longitudinal axis of the optical fibre ribbon 300. In addition, the optical fibre ribbon 300 includes a coating layer 304 to cover the plurality of optical fibres 302. In an embodiment of the present disclosure, the coating layer 304 is made of the matrix material. In general, matrix material binds fibres together and distributes the load. The optical fibre ribbon 300 includes the plurality of optical fibres 302. In an embodiment of the present disclosure, number of the plurality of optical fibres in the optical fibre ribbon 300 is 24. In another embodiment of the present disclosure, number of the plurality of optical fibres 302 in the optical fibre ribbon 300 may vary. In addition, the optical fibre ribbon 300 includes a first slit 306, a second slit 308 and a third slit 310.

In an embodiment of the present disclosure, the first slit 306 is made between eighth optical fibre and ninth optical fibre of the plurality of optical fibres 302 in the optical fibre ribbon 300. In addition, the first slit 306 of about 100 microns is used to access one base 8 from the optical fibre ribbon 300. Further, one base 8 and one base 16 is accessed when the slit 306 is only present in the optical fiber ribbon 300. Further, the second slit 308 is made in between twelfth optical fibre and thirteenth optical fibre of the plurality of optical fibres 302 in the optical fibre ribbon 300. Furthermore, the first slit 306 and the second slit 308 are simultaneously used to access one base 8, one base 4, and one base 12 from the optical fibre ribbon 300. Moreover, the third slit 310 is made along with the first slit 306 and the second slit 308. Also, the third slit 310 is made in between sixteenth optical fibre and seventeenth optical fibre of the plurality of optical fibres 302 in the optical fibre ribbon 300. In addition, the first slit 306, the second slit 308, and the third slit 310 are simultaneously used to access two base 4 ribbons and two base 8 ribbons from the optical fibre ribbon 300.

In an embodiment of the present disclosure, each of the first slit 306, the second slit 308, and the third slit 310 has size of about 100 microns. In another embodiment of the present disclosure, size of the first slit 306, the second slit 308, and the third slit 310 may vary.

In an example, an optical fibre ribbon is provided. The optical fibre ribbon includes a plurality of optical fibres, a first slit and a second slit. In addition, the first slit is made between eighth optical fibre and ninth optical fibre of the plurality of optical fibres in the optical fibre ribbon. Further, the first slit is used to access base 8 and base 16 from the optical fibre ribbon of 24 fibre. Furthermore, the second slit is made between sixteenth optical fibre and seventeenth optical fibre of the plurality of optical fibres in the optical fibre ribbon. Moreover, the first slit and the second slit are simultaneously used to access three optical fibre ribbon of base 8 from the optical fibre ribbon of 24 fibre.

In another example, an optical fibre ribbon of 36 fibres is provided. The optical fibre ribbon includes a plurality of optical fibres, a first slit and a second slit. In addition, the first slit is made between twelfth optical fibre and thirteenth optical fibre of the plurality of optical fibres in the optical fibre ribbon. Further, the first slit is used to access base 12 and base 24 from the optical fibre ribbon of 36 fibres. Furthermore, the second slit is made between twenty-eighth optical fibre and twenty-ninth optical fibre of the plurality of optical fibres in the optical fibre ribbon. Moreover, the first slit and second slit are simultaneously used to access one base 12, one base 16 and one base 8 ribbons from the optical fibre ribbon of 36 fibres.

Figure 4:
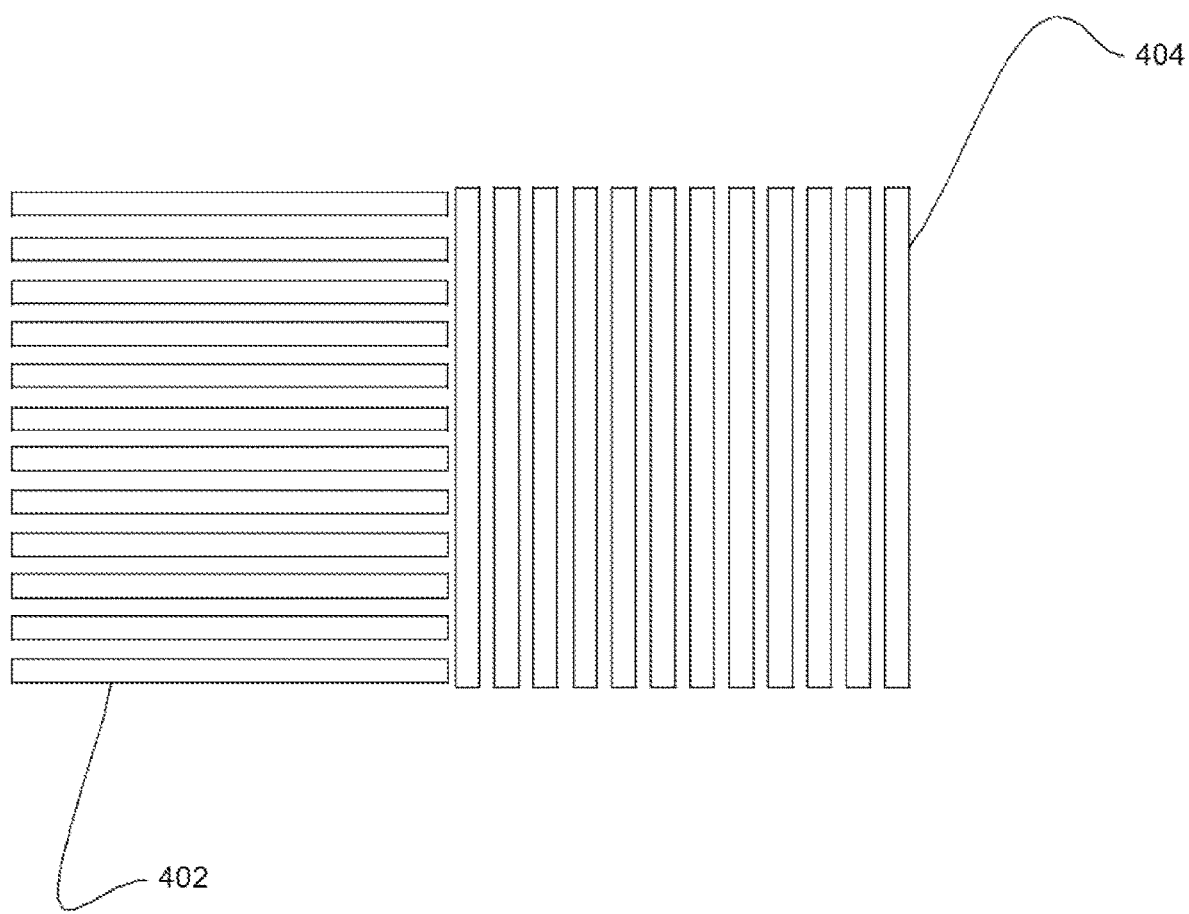
FIG. 4 is a cross sectional view of an optical fibre ribbon stack, in accordance with an embodiment of the present disclosure.

Referring to FIG. 4, this is a cross sectional view of an optical fibre ribbon stack 400, in accordance with an embodiment of the present disclosure. In general, stack is an arrangement of objects in a neat and tidy manner. The optical fibre ribbon stack 400 includes a first optical fibre ribbon stack 402, and a second optical fibre ribbon stack 404.

The first optical fibre ribbon stack 402 includes a first plurality of optical fibre ribbons. In addition, the first plurality of optical fibre ribbons includes a first plurality of optical fibres. The first optical fibre ribbon stack 402 is a horizontal stack. In an embodiment of the present disclosure, the first optical fibre ribbon stack 402 is a vertical stack. The first plurality of optical fibre ribbons in the first optical fibre ribbon stack 402 is placed in a horizontal manner one after another. In addition, the first plurality of optical fibre ribbons of the first optical fibre ribbon stack 402 corresponds to the optical fibre ribbon 100.

The second optical fibre ribbon stack 404 includes a second plurality of optical fibre ribbons. In addition, the second plurality of optical fibre ribbons includes a second plurality of optical fibres. Further, the second plurality of optical fibre ribbons of the second optical fibre ribbon stack 404 corresponds to the optical fibre ribbon 100. The second optical fibre ribbon stack 404 is a vertical stack. In an embodiment of the present disclosure, the second optical fibre ribbon stack 404 is a horizontal stack. The second plurality of optical fibre ribbons in the second optical fibre ribbon stack 404 is placed in a vertical manner one after another.

In an embodiment of the present disclosure, the first optical fibre ribbon stack 402 is arranged horizontally and the second optical fibre ribbon stack 404 is arranged vertically. In addition, horizontal arrangement of the first optical fibre ribbon stack 402 and vertical arrangement of the second optical fibre ribbon stack 404 prevents overlapping between the first plurality of optical fibre ribbons and the second plurality of optical fibre ribbons. Further, planarity is maintained in the first plurality of optical fibre ribbons and the second plurality of optical fibre ribbons of the plurality of optical fibre ribbon stacks 400.

In an embodiment of the present disclosure, number of optical fibers in the first optical fibre ribbon stack 402 is 144. In another embodiment of the present disclosure, number of optical fibers in the first optical fibre ribbon stack 402 may vary. In an embodiment of the present disclosure, each optical fibre ribbon of the first plurality of optical fibre ribbons of the first optical fibre ribbon stack 402 includes 12 number of optical fibres. In another embodiment of the present disclosure, number of optical fibers in each optical fibre ribbon of the first plurality of optical fibre ribbons of the first optical fibre ribbon stack 402 may vary.

In an embodiment of the present disclosure, number of optical fibers in the second optical fibre ribbon stack 404 is 144. In another embodiment of the present disclosure, number of optical fibers in the second optical fibre ribbon stack 404 may vary. In an embodiment of the present disclosure, number of optical fibers in each optical fibre ribbon of the second plurality of optical fibre ribbons is 12. In another embodiment of the present disclosure, number of optical fibers in each optical fibre ribbon of the second plurality of optical fibre ribbons may vary.

In an embodiment of the present disclosure, number of optical fibers in the optical fibre ribbon stack 400 is 288. In another embodiment of the present disclosure, number of optical fibers in the optical fibre ribbon stack 400 may vary. In an embodiment of the present disclosure, the optical fibre ribbon stack 400 has width in a range of about 5.8 millimeter to 6.1 millimeter. In another embodiment of the present disclosure, width of the optical fibre ribbon stack 400 may vary.

In an embodiment of the present disclosure, the second optical fibre ribbon stack 404 is placed adjacent to the first optical fibre ribbon stack 402. In another embodiment of the present disclosure, the first optical fibre ribbon stack 402 is placed adjacent to the second optical fibre ribbon stack 404.

Further, referring to FIG. 4, it may be noted that the optical fibre ribbon stack 400 includes two ribbon stacks; however, those skilled in the art would appreciate that more or less number of ribbon stack are included in the optical fibre ribbon stack 400. Also, the more or less number of ribbon stack may be arranged in any combination of horizontal and vertical configuration.

Figure 5:
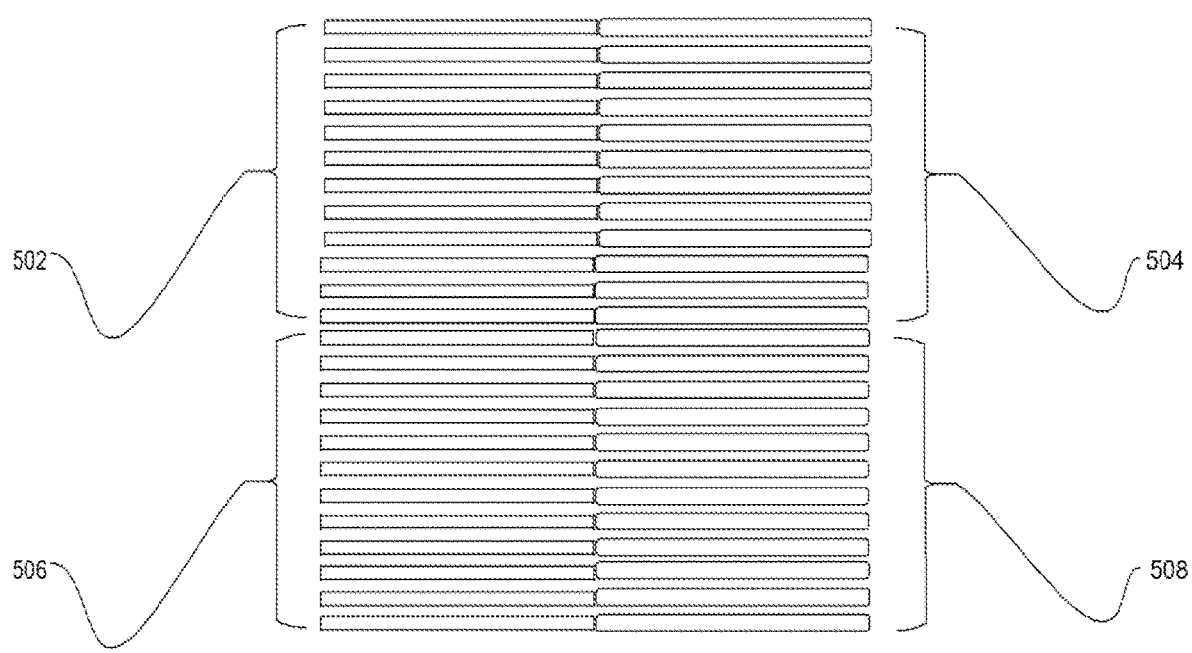
FIG. 5 is a cross sectional view of a plurality of ribbon stacks, in accordance with another embodiment of the present disclosure.

Referring to FIG. 5, this is a cross sectional view of a plurality of ribbon stacks 500, in accordance with another embodiment of the present disclosure. The plurality of optical fibre ribbon stacks 500 includes a first optical fibre ribbon stack 502, a second optical fibre ribbon stack 504, a third optical fibre ribbon stack 506, and a fourth optical fibre ribbon stack 508.

The first optical fibre ribbon stack 502 includes a first plurality of fibre ribbons. In addition, the first plurality of fibre ribbons includes a first plurality of optical fibres. Further, the first plurality of fibre ribbons of the first optical fibre ribbon stack 502 corresponds to the optical fibre ribbon 100. The first optical fibre ribbon stack 502 is a horizontal stack. In an embodiment of the present disclosure, the first optical fibre ribbon stack 502 is a vertical stack. The plurality of optical fibre ribbons in the first optical fibre ribbon stack 502 is placed in a horizontal manner one after another.

The second optical fibre ribbon stack 504 includes a second plurality of fibre ribbons. In addition, the second plurality of fibre ribbons includes a second plurality of optical fibres. Further, the second plurality of fibre ribbons of the second optical fibre ribbon stack 504 corresponds to the optical fibre ribbon 100. The second optical fibre ribbon stack 504 is a horizontal stack. In an embodiment of the present disclosure, the second optical fibre ribbon stack 504 is a vertical stack. The second plurality of fibre ribbons in the second optical fibre ribbon stack 504 is placed in a horizontal manner one after another.

The third optical fibre ribbon stack 506 includes a third plurality of fibre ribbons. In addition, the third plurality of fibre ribbons includes a third plurality of optical fibres. Further, the third plurality of fibre ribbons of the third optical fibre ribbon stack 506 corresponds to the optical fibre ribbon 100. The third optical fibre ribbon stack 506 is a horizontal stack. In an embodiment of the present disclosure, the third optical fibre ribbon stack 506 is a vertical stack. The third plurality of fibre ribbons in the third optical fibre ribbon stack 506 is placed in a horizontal manner one after another.

The fourth optical fibre ribbon stack 508 includes a fourth plurality of fibre ribbons. In addition, the fourth plurality of fibre ribbons includes a fourth plurality of optical fibres. Further, the fourth plurality of fibre ribbons of the fourth optical fibre ribbon stack 508 corresponds to the optical fibre ribbon 100. The fourth optical fibre ribbon stack 508 is a horizontal stack. In an embodiment of the present disclosure, the fourth optical fibre ribbon stack 508 is a vertical stack. The fourth plurality of fibre ribbons in the fourth optical fibre ribbon stack 508 is placed in a horizontal manner one after another.

In an embodiment of the present disclosure, number of optical fibers in the first optical fibre ribbon stack 502 is 144. In another embodiment of the present disclosure, number of optical fibers in the first optical fibre ribbon stack 502 may vary. In an embodiment of the present disclosure, each fibre ribbon of the first plurality of fibre ribbons of the first optical fibre ribbon stack 502 includes 12 number of optical fibres. In another embodiment of the present disclosure, the number of the plurality of optical fibres in each optical ribbon of the first plurality of optical ribbons of the first optical fibre ribbon stack 502 may vary.

In an embodiment of the present disclosure, two consecutive optical fibres of the first plurality of optical fibres has a pitch equal to height of each optical ribbon of the first plurality of optical ribbons irrespective of direction of rotation of the first optical fibre ribbon stack 502. In general, pitch is distance between geometrical centers of any two optical fibres lying adjacent to each other.

In an embodiment of the present disclosure, the second optical fibre ribbon stack 504 includes total number of 144 optical fibres. In another embodiment of the present disclosure, the total number of the plurality of optical fibres in the second optical fibre ribbon stack 504 may vary. In an embodiment of the present disclosure, each fibre ribbon of the second plurality of fibre ribbons of the second optical fibre ribbon stack 504 includes 12 number of optical fibres. In another embodiment of the present disclosure, the number of the second plurality of optical fibres in each fibre ribbon of the second plurality of fibre ribbons of the second optical fibre ribbon stack 504 may vary.

In an embodiment of the present disclosure, number of optical fibers in the third optical fibre ribbon stack 506 is 144. In another embodiment of the present disclosure, number of optical fibers in the third optical fibre ribbon stack 506 may vary. In an embodiment of the present disclosure, number of optical fibers in each fibre ribbon of the plurality of fibre ribbons of the third optical fibre ribbon stack 506 is 12. In another embodiment of the present disclosure, number of optical fibers in each fibre ribbon of the plurality of fibre ribbons of the third optical fibre ribbon stack 506 may vary.

In an embodiment of the present disclosure, number of optical fibers in the fourth optical fibre ribbon stack 508 is 144. In another embodiment of the present disclosure, number of optical fibers in the fourth optical fibre ribbon stack 508 may vary. In an embodiment of the present disclosure, number of optical fibers in each fibre ribbon of the plurality of fibre ribbons of the fourth optical fibre ribbon stack 508 is 12. In another embodiment of the present disclosure, number of optical fibers in each fibre ribbon of the plurality of fibre ribbons of the fourth optical fibre ribbon stack 508 may vary.

In an embodiment of the present disclosure, number of optical fibers in the plurality of optical fibre ribbon stacks 500 is 576. In another embodiment of the present disclosure, number of optical fibers in the plurality of optical fibre ribbon stacks 500 may vary. In an embodiment of the present disclosure, the plurality of optical fibre ribbon stacks 500 has width in a range of about 5.8 millimeter to 6.1 millimeter. In another embodiment of the present disclosure, width of the plurality of optical fibre ribbon stacks 500 may vary.

The first optical fibre ribbon stack 502, the second optical fibre ribbon stack 504, the third optical fibre ribbon stack 506, and the fourth optical fibre ribbon stack 508 are arranged in a perfect square configuration. The plurality of optical fibre ribbon stacks 500 are arranged in the perfect square configuration to improve packing efficiency of buffer tubes in which the plurality of optical fibre ribbon stacks 500 are installed.

The second optical fibre ribbon stack 504 is placed adjacent to the first optical fibre ribbon stack 502. The third optical fibre ribbon stack 506 is placed below the first optical fibre ribbon stack 502. The fourth optical fibre ribbon stack 508 is placed adjacent to the third optical fibre ribbon stack 506.

Figure 6:
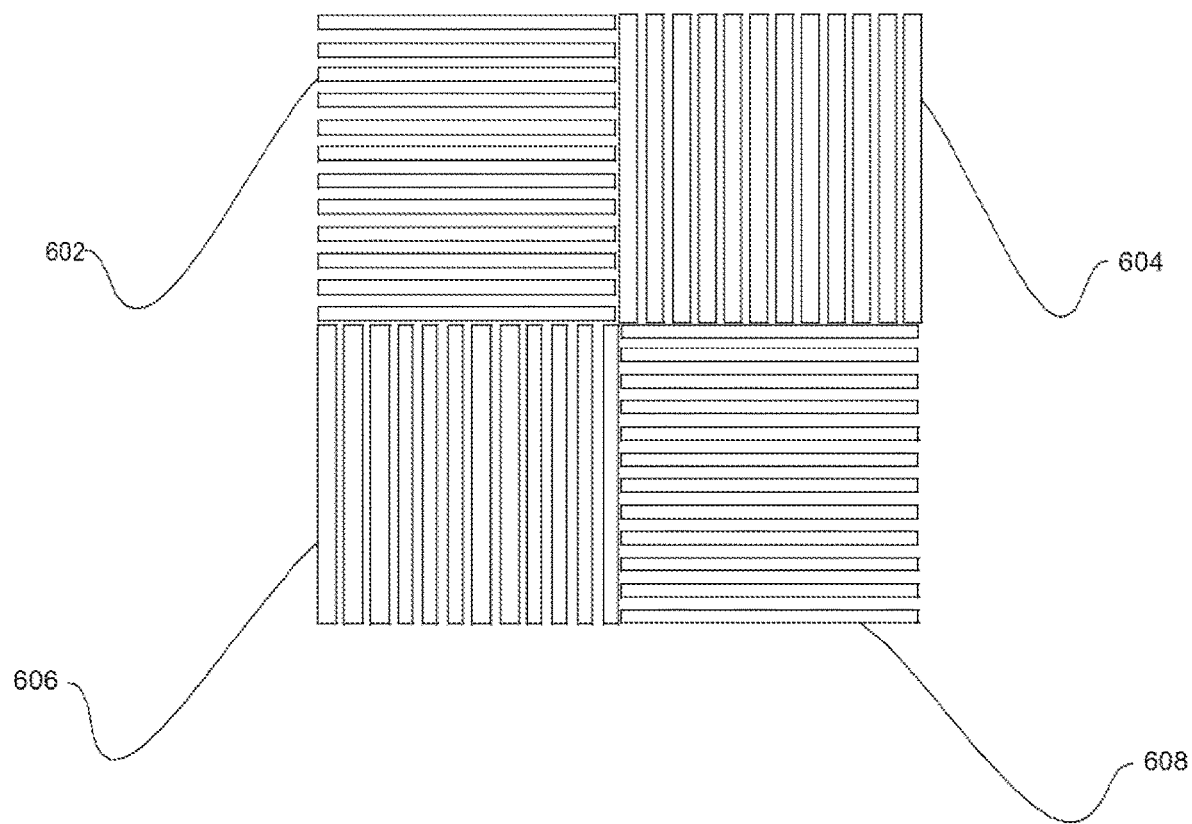
FIG. 6 is a cross sectional view of a plurality of ribbon stacks, in accordance with yet another embodiment of the present disclosure.

Referring to FIG. 6, this is a cross sectional view of a plurality of ribbon stacks 600, in accordance with yet another embodiment of the present disclosure. The plurality of optical fibre ribbon stacks 600 includes a first optical fibre ribbon stack 602, a second optical fibre ribbon stack 604, a third optical fibre ribbon stack 606, and a fourth optical fibre ribbon stack 608.

The first optical fibre ribbon stack 602 includes a first plurality of optical ribbons. In addition, the first plurality of optical ribbons includes a first plurality of optical fibres. Further, the first plurality of optical fibre ribbons of the first optical fibre ribbon stack 602 corresponds to the optical fibre ribbon 100. The first optical fibre ribbon stack 602 is a horizontal stack. In an embodiment of the present disclosure, the first optical fibre ribbon stack 602 is a vertical stack. The first plurality of optical ribbons in the first optical fibre ribbon stack 602 is placed in a horizontal manner one after another.

The second optical fibre ribbon stack 604 includes a second plurality of optical ribbons. In addition, the second plurality of optical ribbons includes a second plurality of optical fibres. Further, the second plurality optical fibre ribbons of the second optical fibre ribbon stack 604 corresponds to the optical fibre ribbon 100. The second optical fibre ribbon stack 604 is a vertical stack. In an embodiment of the present disclosure, the second optical fibre ribbon stack 604 is a horizontal stack. The second plurality of optical ribbons in the second optical fibre ribbon stack 604 is placed in a vertical manner one after another.

The third optical fibre ribbon stack 606 includes a third plurality of optical ribbons. In addition, the third plurality of optical ribbons includes a third plurality of optical fibres. Further, the third plurality of optical fibre ribbons of the third optical fibre ribbon stack 606 corresponds to the optical fibre ribbon 100. The third optical fibre ribbon stack 606 is a vertical stack. In an embodiment of the present disclosure, the third optical fibre ribbon stack 606 is a horizontal stack. The third plurality of optical ribbons in the third optical fibre ribbon stack 606 is placed in a vertical manner one after another.

The fourth optical fibre ribbon stack 608 includes a fourth plurality of optical ribbons. In addition, the fourth plurality of optical ribbons includes a fourth plurality of optical fibres. Further, the fourth plurality of optical fibre ribbons of the fourth optical fibre ribbon stack 608 corresponds to the optical fibre ribbon 100. The fourth optical fibre ribbon stack 608 is a horizontal stack. In an embodiment of the present disclosure, the fourth optical fibre ribbon stack 608 is a vertical stack. The fourth plurality of optical ribbons in the fourth optical fibre ribbon stack 608 is placed in a horizontal manner one after another.

In an embodiment of the present disclosure, number of optical fiber in the first optical fibre ribbon stack 602 is 144. In another embodiment of the present disclosure, number of optical fiber in the first optical fibre ribbon stack 602 may vary. In an embodiment of the present disclosure, number of optical fibers in each optical ribbon of the plurality of optical ribbons of the first optical fibre ribbon stack 602 is 12. In another embodiment of the present disclosure, number of optical fibers in each optical ribbon of the plurality of optical ribbons of the first optical fibre ribbon stack 602 may vary.

In an embodiment of the present disclosure, number of optical fiber in the second optical fibre ribbon stack 604 is 144. In another embodiment of the present disclosure, number of optical fiber in the second optical fibre ribbon stack 604 may vary. In an embodiment of the present disclosure, each optical ribbon of the second plurality of optical ribbons of the second optical fibre ribbon stack 604 includes 12 number of optical fibres. In another embodiment of the present disclosure, number of the second plurality of optical fibres in each optical ribbon of the plurality of optical ribbons of the second optical fibre ribbon stack 604 may vary.

In an embodiment of the present disclosure, number of optical fibers in the third optical fibre ribbon stack 606 is 144. In another embodiment of the present disclosure, number of optical fibers in the third optical fibre ribbon stack 606 may vary. In an embodiment of the present disclosure, each optical ribbon of the third plurality of optical ribbons of the third optical fibre ribbon stack 606 includes 12 number of optical fibres. In another embodiment of the present disclosure, number of the third plurality of optical fibres in each optical ribbon of the plurality of optical ribbons of the third optical fibre ribbon stack 606 may vary.

In an embodiment of the present disclosure, number of optical fibers in the fourth optical fibre ribbon stack 608 144. In another embodiment of the present disclosure, number of optical fibers in the fourth optical fibre ribbon stack 608 may vary. In an embodiment of the present disclosure, each optical ribbon of the fourth plurality of optical ribbons of the fourth optical fibre ribbon stack 608 includes 12 number of optical fibres. In another embodiment of the present disclosure, number of the fourth plurality of optical fibres in each optical ribbon of the plurality of optical ribbons of the fourth optical fibre ribbon stack 608 may vary.

In an embodiment of the present disclosure, number of optical fibers in the plurality of optical fibre ribbon stacks 600 is 576. In another embodiment of the present disclosure, number of optical fibers in the plurality of optical fibre ribbon stacks 600 may vary. In an embodiment of the present disclosure, the plurality of optical fibre ribbon stacks 600 has width in a range of about 5.8 millimeter to 6.1 millimeter. In another embodiment of the present disclosure, width of the plurality of optical fibre ribbon stacks 600 may vary.

The first optical fibre ribbon stack 602, the second optical fibre ribbon stack 604, the third optical fibre ribbon stack 606, and the fourth optical fibre ribbon stack 608 are arranged in a perfect square configuration. The plurality of optical fibre ribbon stacks 600 are arranged in the perfect square configuration to improve packing efficiency of buffer tubes in which the plurality of optical fibre ribbon stacks 600 are installed.

The second optical fibre ribbon stack 604 is placed adjacent to the first optical fibre ribbon stack 602. The third optical fibre ribbon stack 606 is placed below the first optical fibre ribbon stack 602. The fourth optical fibre ribbon stack 608 is placed adjacent to the third optical fibre ribbon stack 606.

Further, referring to FIG. 5 and FIG. 6, it may be noted that the plurality of optical fibre ribbon stack 500, 600 includes four ribbon stack; however, those skilled in the art would appreciate that more or less number of ribbon stack are included in the plurality of optical fibre ribbon stack 400. Also, the more or less number of ribbon stack may be arranged in any combination of horizontal and vertical configuration to form a shape of perfect square. In an embodiment of the present disclosure, the number of fibre cores in horizontal direction and vertical direction in ribbon stack 500 is same as the number of fibre cores in horizontal direction and vertical direction in ribbon stack 600.

Figure 7:
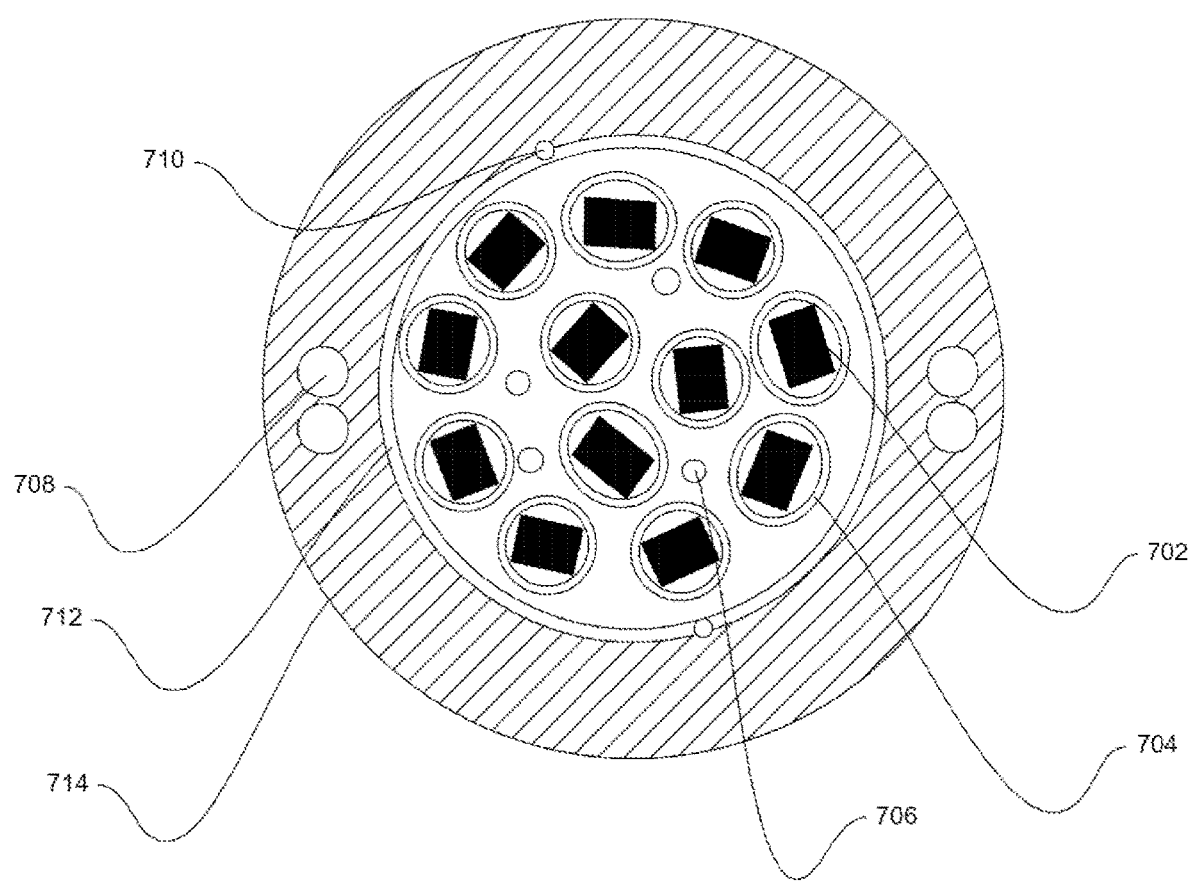
FIG. 7 is a cross sectional view of an optical fibre cable, in accordance with an embodiment of the present disclosure.

Referring to FIG. 7, this is a cross sectional view of an optical fibre cable 700, in accordance with an embodiment of the present disclosure. The optical fibre cable 700 includes the plurality of optical fibre ribbon stacks 702, a plurality of buffer tubes 704, and one or more water swellable yarns 706. In addition, the optical fibre cable 700 includes a plurality of embedded strength members 708, one or more ripcords 710, a water blocking tape 712, and a sheath 714.

In an embodiment of the present disclosure, the plurality of optical fibre ribbon stacks 702 is similar to the plurality of optical fibre ribbon stacks 400. In another embodiment of the present disclosure, the plurality of optical fibre ribbon stacks 702 is similar to the plurality of optical fibre ribbon stacks 500. In yet another embodiment of the present disclosure, the plurality of optical fibre ribbon stacks 702 is any optical fibre ribbon stack having the perfect square configuration.

The plurality of optical fibre ribbon stacks 702 are enclosed within each buffer tube of the plurality of buffer tubes 704. In addition, each buffer tube of the plurality of buffer tubes 704 is a tube for enclosing the plurality of optical fibre ribbon stacks 702. Further, the plurality of buffer tubes 704 provide support and protection to the plurality of optical fibre ribbon stacks 702 against crush, bend and stretch. Furthermore, the plurality of buffer tubes 704 prevents ingression of water inside the plurality of optical fibre ribbon stacks 702. In an embodiment of the present disclosure, the plurality of buffer tubes 704 are made of one of thermoplastic co-polyester elastomer, low smoke zero halogen material, and the like.

In an embodiment of the present disclosure, number of the plurality of buffer tubes 704 in the optical fibre cable 700 is 3. In addition, each buffer tube of the plurality of buffer tubes 704 includes the plurality of optical fibre ribbon stacks 702. In addition, number of the plurality of optical fibres in the plurality of optical fibre ribbon stacks 702 is 576. Therefore, total number of the plurality of optical fibres in the optical fibre cable 700 is 1728 (576*3). In addition, the optical fibre cable 700 having fibre count of 1728 optical fibres has a diameter of about 24.9 millimeter. In another embodiment of the present disclosure, the diameter of the optical fibre cable 700 having fibre count of 1728 optical fibres may vary.

In an embodiment of the present disclosure, number of the plurality of buffer tubes 704 in the optical fibre cable 700 is 6. In addition, each buffer tube of the plurality of buffer tubes 704 includes the plurality of optical fibre ribbon stacks 702. In addition, number of the plurality of optical fibres in the plurality of optical fibre ribbon stacks 702 is 576. Therefore, total number of the plurality of optical fibres in the optical fibre cable 700 is 3456 (576*6). In addition, the optical fibre cable 700 having fibre count of 3456 optical fibres has a diameter of about 31.6 millimeter. In another embodiment of the present disclosure, the diameter of the optical fibre cable 700 having fibre count of 3456 optical fibres may vary.

In an embodiment of the present disclosure, number of the plurality of buffer tubes 704 in the optical fibre cable 700 is 12. In addition, each buffer tube of the plurality of buffer tubes 704 includes the plurality of optical fibre ribbon stacks 702. In addition, number of the plurality of optical fibres in the plurality of optical fibre ribbon stacks 702 is 576. Therefore, total number of the plurality of optical fibres in the optical fibre cable 700 is 6912 (576*12). In addition, the optical fibre cable 700 having fibre count of 6912 optical fibres has a diameter of about 43 millimeter. In another embodiment of the present disclosure, the diameter of the optical fibre cable 700 having fibre count of 6912 optical fibres may vary.

In an embodiment of the present disclosure, number of the plurality of buffer tubes 704 in the optical fibre cable 700 is 12. In addition, each buffer tube of the plurality of buffer tubes 704 includes the plurality of optical fibre ribbon stacks 702. In addition, number of the plurality of optical fibres in each buffer tube of the plurality of buffer tubes 704 is 144. Therefore, total number of the plurality of optical fibres in the optical fibre cable 700 is 1728 (144*12). In addition, the optical fibre cable 700 having fibre count of 1728 optical fibres has a diameter of about 26.5 millimeter. In another embodiment of the present disclosure, the diameter of the optical fibre cable 700 having fibre count of 1728 optical fibres may vary.

In an embodiment of the present disclosure, number of the plurality of buffer tubes 704 in the optical fibre cable 700 is 24. In addition, each buffer tube of the plurality of buffer tubes 704 includes the plurality of optical fibre ribbon stacks 702. In addition, number of the plurality of optical fibres in each buffer tube of the plurality of buffer tubes 704 is 144. Therefore, total number of the plurality of optical fibres in the optical fibre cable 700 is 3456 (144*24). In addition, the optical fibre cable 700 having fibre count of 3456 optical fibres has a diameter of about 34.2 millimeter. In another embodiment of the present disclosure, the diameter of the optical fibre cable 700 having fibre count of 3456 optical fibres may vary.

In an embodiment of the present disclosure, number of the plurality of buffer tubes 704 in the optical fibre cable 700 is 48. In addition, each buffer tube of the plurality of buffer tubes 704 includes the plurality of optical fibre ribbon stacks 702. In addition, number of the plurality of optical fibres in each buffer tube of the plurality of buffer tubes 704 is 144. Therefore, total number of the plurality of optical fibres in the optical fibre cable 700 is 6912 (144*48). In addition, the optical fibre cable 700 having fibre count of 6912 optical fibres has a diameter of about 48 millimeter. In another embodiment of the present disclosure, the diameter of the optical fibre cable 700 having fibre count of 6912 optical fibres may vary.

In yet another embodiment of the present disclosure, number of the plurality of buffer tubes 704 in the optical fibre cable 700 may vary. Further, total number of the plurality of optical fibres in the optical fibre cable 700 depends on number of the plurality of buffer tubes 704 in the optical fibre cable 400.

The optical fibre cable 700 includes the one or more water swellable yarns 706. Moreover, the one or more water swellable yarns 706 are dispersed between each of the plurality of buffer tubes 704. The one or more swellable yarns 706 facilitates absorption of water and moisture. Also, the one or more water swellable yarns 706 prevents ingression of water inside the optical fibre cable 700. In an embodiment of the present disclosure, the optical fibre cable 700 may have any number of the one or more water swellable yarns 706.

The optical fibre cable 700 includes the water blocking tape 712. The water blocking tape 712 prevents exposure of the plurality of buffer tubes 704 and the plurality of optical fibre ribbon stacks 702 to hydroxyl ions. In addition, the water blocking tape 712 prevents ingression of water inside the optical fibre cable 700. Further, the water blocking tape 712 is characterized by width and thickness. In an embodiment of the present disclosure, width of the water blocking tape 712 may vary. In an embodiment of the present disclosure, thickness of the water blocking tape 712 may vary.

The optical fibre cable 700 of the present disclosure includes the sheath 714. The sheath 714 surrounds the water blocking tape 712. The sheath 714 interacts directly with ambient environment. The sheath 714 protects the optical fibre cable 700 against crush, bend and tensile stress along length of the optical fibre cable 700. In an embodiment of the present disclosure, the sheath 714 is made of one of high density poly-ethylene (HDPE) material, medium density poly-ethylene (HDPE) material, nylon material, low smoke zero halogen (LSZH) material, fire retardant poly-ethylene (FRPE) material, poly vinyl chloride (PVC) material, and the like. In an embodiment of the present disclosure, the sheath 714 is ultra violet proof sheath.

The optical fibre cable 700 of the present disclosure includes one or more ripcords 710 for ease of entry. In an embodiment of the present disclosure, the one or more ripcords 710 are positioned along the water blocking tape 712 in the optical fibre cable 700. The one or more ripcords 710 extend longitudinally along length of the optical fibre cable 700. In another embodiment of the present disclosure, the one or more ripcords 710 are positioned along the sheath 714 in the optical fibre cable 700. The one or more ripcords 710 extend longitudinally along length of the sheath 714 in the optical fibre cable 700. In yet another embodiment of the present disclosure, the one or more ripcords 710 are positioned in between the water blocking tape 712 and the sheath 714 in the optical fibre cable 700. The one or more ripcords 710 extend longitudinally between the water blocking tape 712 and the sheath 714.

In an embodiment of the present disclosure, number of the one or more ripcords 710 is two. In another embodiment of the present disclosure, the number of the one or more ripcords 710 may vary. In an embodiment of the present disclosure, the one or more ripcords 710 are placed diagonally opposite to each other in between the water blocking tape 712 and the sheath 714.

The optical fibre cable 700 includes the plurality of embedded strength members 708. The plurality of embedded strength members 708 provides strength to the optical fibre cable 700. In an embodiment of the present disclosure, the plurality of embedded strength members 708 is made of glass yarn. In another embodiment of the present disclosure, the plurality of embedded strength members 708 is made of any suitable material. The plurality of embedded strength members 708 is embedded in periphery of the sheath 714. In an embodiment of the present disclosure, the plurality of embedded strength members 708 may be embedded at any position in the sheath 714.

In an embodiment of the present disclosure, number of the plurality of embedded strength members 708 is 4. In another embodiment of the present disclosure, number of the plurality of embedded strength members 708 may vary. In an example, number of the plurality of embedded strength members 708 is 4. The plurality of embedded strength members 708 is embedded in the sheath in first pair and second pair. The first pair and the second pair lies diametrically opposite to each other in the sheath 714.

The plurality of optical fibre ribbon stacks 702 are arranged in the perfect square configuration to increases packing efficiency of the plurality of optical fibres in the plurality of optical fibre ribbon stacks 702. In an example, the perfect square configuration of the plurality of optical fibre ribbon stacks 702 increase packing efficiency of a cable in which the plurality of optical fibre ribbon stacks 702 is installed. In another example, the perfect square configuration of the plurality of optical fibre ribbon stacks 702 reduce overall diameter of the optical fibre cable 700 in which the plurality of optical fibre ribbon stacks 702 are installed. In addition, the perfect square configuration of the plurality of optical fibre ribbon stacks 702 reduces installation time during mass splicing technique. The perfect square configuration of the plurality of optical fibre ribbon stacks 702 allows reduction in dimensions of the plurality of optical fibre ribbon stacks 702.

Figure 8:
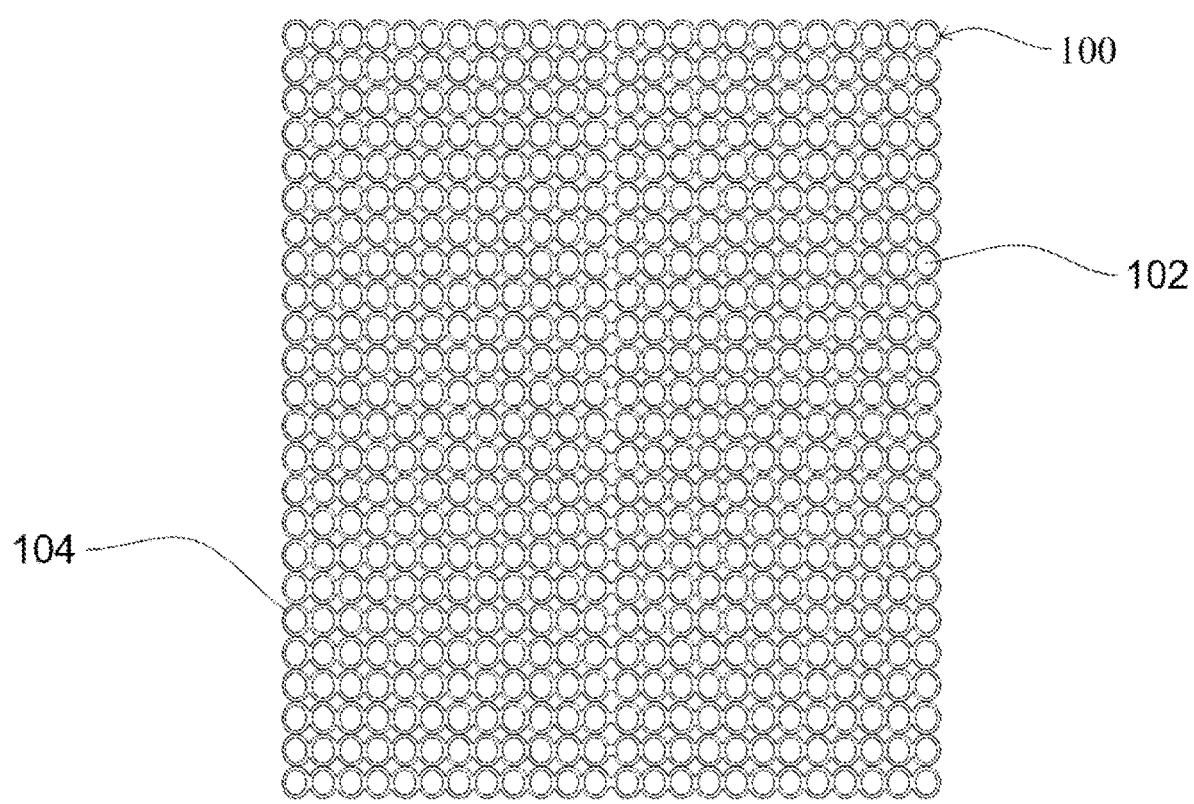
FIG. 8 is an optical fibre ribbon stack with square shaped configuration, in accordance with an embodiment of the present disclosure.

Referring to FIG. 8, this is an optical fibre ribbon stack 800 with square shaped configuration, in accordance with an embodiment of the present disclosure. The optical fibre ribbon stack 800 includes a plurality of optical fibre ribbons. In addition, each of the plurality of optical fibre ribbons is the optical fibre ribbon 100 of FIG. 1.

The plurality of optical fibre ribbons of the present disclosure is arranged in a shape of square to form the optical fibre ribbon stack 800. The square shaped configuration of the optical fibre ribbon stack 800 increases packing density of the plurality of optical fibres 102 in the optical fibre ribbon stack 800. In an embodiment of the present disclosure, the square shaped configuration has equal diagonals for any number of optical fibre ribbons in the optical fibre ribbon stack 800. In an embodiment of the present disclosure, the square shaped configuration of the optical fibre ribbon stack 800 helps to achieve less space. In an example, the square shaped configuration of the optical fibre ribbon stack 800 increases packing efficiency of a cable in which the optical fibre ribbon stack 800 is installed. In another example, the square shaped configuration of the optical fibre ribbon stack 800 reduces overall diameter of the cable. In addition, the square shaped configuration of the optical fibre ribbon stack 800 reduces installation time during mass splicing technique. In an embodiment of the present disclosure, the plurality of optical fibre ribbons may be arranged in any shape to form the optical fibre ribbon stack 800.

In an embodiment of the present disclosure, planarity is maintained in the plurality of optical fibre ribbons in the optical fibre ribbon stack 800. The plurality of optical fibres in each optical fibre ribbon of the optical fibre ribbon stack lie in same plane in each optical fibre ribbon in the plurality of optical fibre ribbons of the optical fibre ribbon stack 800. In an embodiment of the present disclosure, height of the optical fibre ribbon stack 800 is in a range of about 5.8 millimeters to 6.2 millimeters. In another embodiment of the present disclosure, the range of height of the optical fibre ribbon stack 800 may vary. In an embodiment of the present disclosure, width of the optical fibre ribbon stack 800 is in a range of about 5.85 millimeters to 6.2 millimeters. In another embodiment of the present disclosure, the range of width of the optical fibre ribbon stack 800 may vary.

In an embodiment of the present disclosure, number of the plurality of optical fibre ribbons in the optical fibre ribbon stack 800 is 24. In addition, each optical fibre ribbon 100 of the plurality of optical fibre ribbons includes 24 optical fibres. Further, number of the plurality of optical fibres 102 in the optical fibre ribbon stack 800 is 576. In another embodiment of the present disclosure, number of the plurality of optical fibre ribbons in the optical fibre ribbon stack 800 may vary.

In an embodiment of present disclosure, pitch between any two optical fibres is equal to height of the optical fibre ribbon 100. In an embodiment of the present disclosure, pitch of the plurality of optical fibres 102 in the optical fibre ribbon 100 is equal to height of each of the plurality of optical fibre ribbons of the optical fibre ribbon stack 800. In an embodiment of present disclosure, number of cores of optical fibres positioned in a horizontal direction or in a row is equal to number of cores of optical fibres positioned in a vertical direction or in a column.

Figure 9:
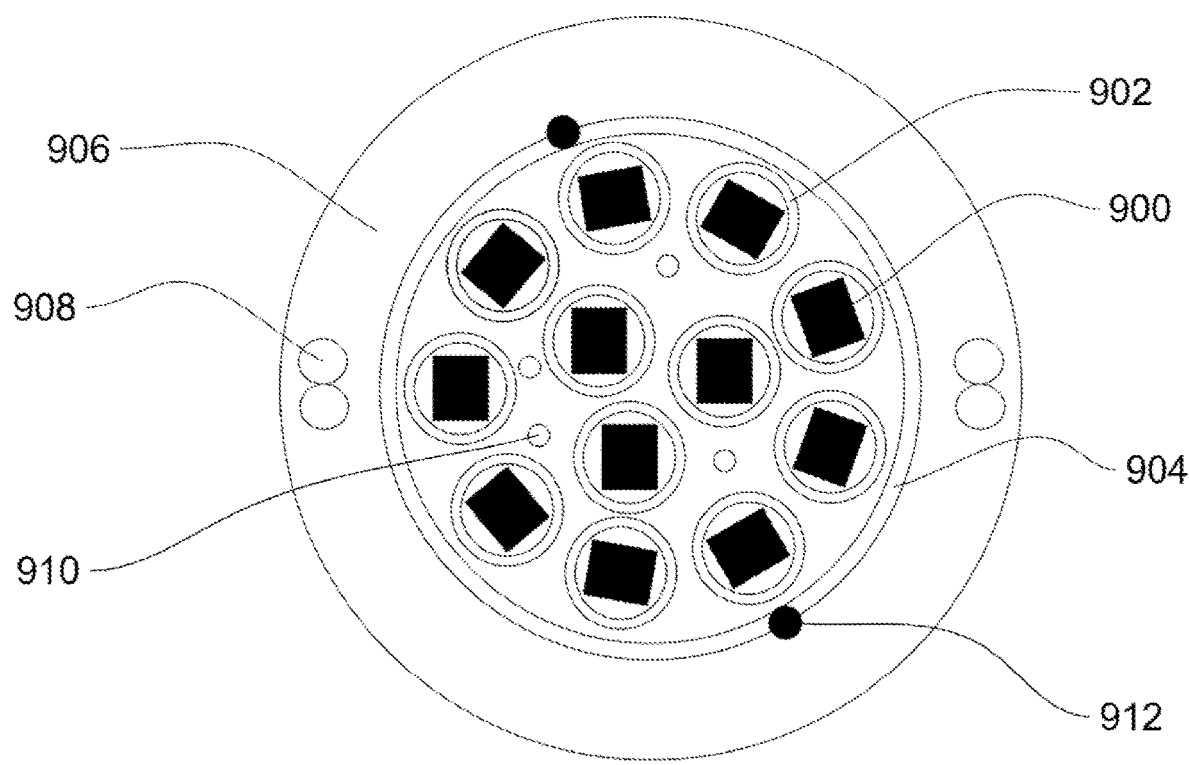
FIG. 9 is an example of optical fibre cable with the optical fibre ribbon stack of FIG. 8, in accordance with an embodiment of the present disclosure.

Referring to FIG. 9 for a more explanation, this is an example of optical fibre cable with the optical fibre ribbon stack of FIG. 8, in accordance with an embodiment of the present disclosure. The optical fibre cable 900 includes a plurality of buffer tubes 902, a water blocking layer 904, a plurality of strength members 908, a plurality of water swellable yarns 910, a plurality of ripcords 912 and a sheath 906.

In an embodiment of the present disclosure, number of the plurality of buffer tubes 902 in the optical fibre cable 900 is 12. In addition, each buffer tube of the plurality of buffer tubes 902 includes the optical fibre ribbon stack 800 of FIG. 8. In addition, number of the plurality of optical fibres 102 in the optical fibre ribbon stack 800 is 576.

Therefore, total number of the plurality of optical fibres 102 in the optical fibre cable 900 is 6912 (576*12). The optical fibre cable 900 has a diameter of about 43 millimetres corresponding to 6912 optical fibres. In an example, the optical fibre cable 900 corresponding to 6912 optical fibres has 10.40% reduction in overall diameter when compared with conventional cable having same number of optical fibres.

In another embodiment of the present disclosure, number of the plurality of buffer tubes 902 in the optical fibre cable 900 is 6. Further, each buffer tube of the plurality of buffer tubes 902 includes the optical fibre ribbon stack 800 of FIG. 8. In addition, number of the plurality of optical fibres 102 in the optical fibre ribbon stack 800 is 576. Therefore, total number of the plurality of optical fibres 102 in the optical fibre cable 900 is 3456 (576*6). The optical fibre cable 900 has a diameter of about 31.6 millimetres corresponding to 3456 optical fibres. In an example, the optical fibre cable 900 corresponding to 3456 optical fibres has 7.60% reduction in overall diameter when compared with conventional cable having same number of optical fibres.

In yet another embodiment of the present disclosure, number of the plurality of buffer tubes 902 in the optical fibre cable 900 is 3. Furthermore, each buffer tube of the plurality of buffer tubes 902 includes the optical fibre ribbon stack 800 of FIG. 8. In addition, number of the plurality of optical fibres 102 in the optical fibre ribbon stack 800 is 576. Therefore, total number of the plurality of optical fibres 102 in the optical fibre cable 900 is 1728 (576*3). The optical fibre cable 900 has a diameter of about 24.9 millimeters corresponding to 1728 optical fibres. In an example, the optical fibre cable 900 corresponding to 1728 optical fibres has 6.03% reduction in overall diameter when compared with conventional cable having same number of optical fibres. The reduction in diameter of the optical fibre cable 900 increases with increase in number of optical fibres.

In yet another embodiment of the present disclosure, number of the plurality of buffer tubes 902 in the optical fibre cable 900 may vary. Further, total number of the plurality of optical fibres 102 in the optical fibre cable 900 depends on number of the plurality of buffer tubes 902 in the optical fibre cable 900.

Further, the optical fibre cable 900 includes the water blocking layer 904. The water blocking layer 904 surrounds the plurality of buffer tubes 902. The water blocking layer 904 prevents ingression of water inside the plurality of buffer tubes 902. Furthermore, the optical fibre cable 900 includes the sheath 906 and the plurality of strength members 908. In an embodiment of the present disclosure, the sheath 906 is ultra violet proof sheath. The sheath 906 surrounds the water blocking layer 904. Moreover, each of the plurality of strength members 908 is embedded inside the sheath 906. In an embodiment of the present disclosure, number of the plurality of strength members 908 is four. In another embodiment of the present disclosure, number of the plurality of strength members 908 may vary.

Also, the optical fibre cable 900 includes the plurality of water swellable yarns 910. The plurality of water swellable yarns 910 is positioned along with the plurality of buffer tubes 902. Also, the optical fibre cable 900 includes the plurality of ripcords 912. In an embodiment of the present disclosure, number of the plurality of ripcords 912 is two. In another embodiment of the present disclosure, the number of the plurality of ripcords 912 may vary. In an embodiment of the present disclosure, the plurality of ripcords 912 is placed diagonally opposite to each other in between the water blocking layer 904 and the sheath 906. The use of the optical fibre ribbon stack 800 is not limited to the optical fibre cable 900 disclosed here and can be used in any other type of cable. The structure of an optical fibre cable containing the optical fibre ribbon stack 800 will vary based on fibre count.

In the art of the present disclosure, the optical fibre ribbon stack arrangement and the optical fibre ribbon has numerous advantages over the prior art. The optical fibre ribbon with the one or more base access helps in mass fusion splicing. In addition, the optical fibre ribbon with the one or more base access helps in reduction of dimensions of the optical fibre ribbon. Further, it maintains planarity in the optical fibre ribbon. Furthermore, the optical fibre ribbon with the one or more base access is flexible and can be bent easily backwards in arc. The optical fibre ribbon stack has reduced height. In addition, the optical ribbon stack has high packing efficiency due to square shaped configuration. Further, the plurality of optical fibres has high packing density. Furthermore, the optical fibre ribbon stack has high fibre count. Moreover, the optical fibre ribbon stack reduces overall diameter of the cable in which it is installed.

Although, the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An optical fibre ribbon stack for use in an optical fiber cable, the optical fibre ribbon stack comprising:
a plurality of optical fibre ribbons, wherein each optical fibre ribbon of the plurality of optical fibre ribbons has one or more base access, wherein each optical fibre ribbon is partially or fully coated with a coating layer in a corrugated manner and the coating layer is discontinuous along length of the optical fibre cable, wherein an optical fibre ribbon of the plurality of optical fibre ribbons comprises:
a plurality of optical fibres arranged such that adjacent optical fibers in the optical fiber ribbon are connected along the length; and
a slit between at least two optical fibres of the plurality of optical fibre ribbons;
wherein the plurality of optical fibre ribbons having the slit between the at least two optical fibres is arranged in a perfect square shape configuration to form the stack.

2. The optical fibre ribbon stack as claimed in claim 1, wherein the plurality of optical fibre ribbons has a plurality of slits to split the optical fibre ribbon for two or more base access.

3. The optical fibre ribbon stack as claimed in claim 1, wherein the optical fibre ribbon is one of a regular flat ribbon, an intermittent bonded ribbon and a bendable ribbon.

4. The optical fibre ribbon stack as claimed in claim 1, wherein the optical fibre ribbon has corrugated surface on top surface and bottom surface, wherein the slit is on the top surface of the optical fibre ribbon.

5. The optical fibre ribbon stack as claimed in claim 1, wherein the coating layer bonds the plurality of optical fibres, wherein the coating layer is made of a matrix material.

6. The optical fibre ribbon stack as claimed in claim 1, wherein the coating layer of the optical fibre ribbon has uniform thickness throughout the plurality of optical fibres.

7. The optical fibre ribbon stack as claimed in claim 2, wherein two slits of the plurality of slits in the optical fibre ribbon provides easy access of three base-8 of the optical fibre ribbon, wherein the optical fibre ribbon comprises 24 optical fibres.

8. The optical fibre ribbon stack as claimed in claim 1, wherein the slit in the optical fibre ribbon has width in a range of 50 micron to 100 micron.

9. The optical fibre ribbon stack as claimed in claim 1, wherein the slit is one of a "V" shaped and "U" shaped.

10. The optical fibre ribbon stack as claimed in claim 1, wherein each of the plurality of optical fibre ribbons has pitch value equal to height of each of the plurality of optical fibre ribbons.

11. The optical fiber ribbon stack as claimed in claim 1, wherein the base access is to split a large width optical fibre ribbon with more number of fibre into two or more small width optical fibre ribbon with less number of fibre.

12. The optical fiber ribbon stack as claimed in claim 1, wherein a number of the plurality of optical fibres placed in horizontal direction is equal to a number of the plurality of optical fibres placed in vertical direction.

13. The optical fiber ribbon stack as claimed in claim 1, wherein the optical fibre ribbon stack is in a form of 24F*24F square shape.

14. The optical fiber ribbon stack as claimed in claim 1, wherein a number of the plurality of optical fibres in the optical fibre ribbon stack is 576.

15. The optical fiber ribbon stack as claimed in claim 1, wherein the optical fibre ribbon stack has height in a range of 5.8 millimeter to 6.2 millimeter.

16. The optical fiber ribbon stack as claimed in claim 1, wherein the optical fibre ribbon stack has width in a range of 5.8 millimeter to 6.2 millimeter.

17. The optical fiber ribbon stack as claimed in claim 1, wherein the optical fiber ribbon has the length of 6150 micrometre.

18. The optical fibre ribbon stack as claimed in claim 1, wherein each of the plurality of optical fibres in the optical fibre ribbon is aligned at a pitch in range of 180 micron to 250 micron.

19. The optical fiber ribbon stack as claimed in claim 2, wherein at least two slits of the plurality of slits are simultaneously used to access the two or more base access.

\* \* \* \* \*